(12) United States Patent
Velagaleti et al.

(10) Patent No.: US 7,729,298 B2
(45) Date of Patent: Jun. 1, 2010

(54) METHOD AND SYSTEM FOR MANIPULATING A SHARED OBJECT

(75) Inventors: Prashant R. Velagaleti, Carpentersville, IL (US); Vivek V. Thakkar, Elk Grove Village, IL (US)

(73) Assignee: Motorola, Inc., Schaumburg, IL (US)

( * ) Notice: Subject to any disclaimer, the term of this patent is extended or adjusted under 35 U.S.C. 154(b) by 967 days.

(21) Appl. No.: 10/983,860

(22) Filed: Nov. 8, 2004

(65) Prior Publication Data

US 2006/0099988 A1 May 11, 2006

(51) Int. Cl.
*H04L 12/16* (2006.01)
*H04Q 11/00* (2006.01)

(52) U.S. Cl. .................. 370/260; 370/271; 715/706; 455/420

(58) Field of Classification Search ............. 455/420, 455/416, 419, 466, 515, 517, 518, 519; 370/260, 370/261, 262, 263, 264, 265, 266, 267, 268, 370/269; 709/204, 227; 715/706, 740, 864
See application file for complete search history.

(56) References Cited

U.S. PATENT DOCUMENTS

| | | | | | |
|---|---|---|---|---|---|
| 5,905,719 | A | * | 5/1999 | Arnold et al. | 370/330 |
| 6,728,754 | B1 | * | 4/2004 | Lipton | 709/203 |
| 6,791,945 | B1 | * | 9/2004 | Levenson et al. | 370/235 |
| 7,634,731 | B2 | * | 12/2009 | Lee | 715/706 |
| 2003/0053423 | A1 | * | 3/2003 | Mateu | 370/261 |
| 2003/0058275 | A1 | * | 3/2003 | Pilu et al. | 345/751 |

* cited by examiner

*Primary Examiner*—Edward Urban
*Assistant Examiner*—Christian A Hannon
(74) *Attorney, Agent, or Firm*—Jon A. Gibbons; Fleit Gibbons Gutman Bongini P.L.

(57) ABSTRACT

A system includes a first wireless device (102) and a second wireless device (106), each having at least two communication modes—one for voice transmission and reception and one for data transmission and reception, and able to communicate wirelessly with each other. The system also includes a shared object between the two devices. During an ongoing conversation between a user of the first device (102) and a user of the second device (106), an object is exchanged between the devices. The devices, working within available manipulation capabilities, communicate manipulation instructions to one another on the data mode of communication. The instructions are carried out and the object is manipulated, providing a shared interactive quasi-real-time or real-time experience.

23 Claims, 6 Drawing Sheets

METHOD AND SYSTEM FOR MANIPULATING A SHARED OBJECT

BACKGROUND OF THE INVENTION

1. Field of the Invention

The present invention relates generally to the field of wireless devices, and more particularly relates to manipulating an electronic object shared by two wireless devices.

2. Background of the Invention

Mobile communication devices are in widespread use throughout the world, and are especially popular in metropolitan regions. Initially these devices facilitated mobile telephony, but more recently these devices have begun providing many other services and functions.

Developers have been creating applications for use on mobile communication devices that allow users to perform various tasks. For example, presently mobile communication devices having cameras are popular in the marketplace. These devices allow a user to take a picture or even a short video clip with the mobile communication device. The image or video can be viewed on the mobile communication device and transmitted to others. In addition, mobile communication devices are becoming more and more robust in the sense of processing abilities, with many handheld devices having the capability to run local and/or network applications. In particular, multimedia capabilities over data network services have become very popular and allow users the ability to interact with each other over networks by, for example, sending and receiving ("sharing") pictures, drawings, sounds, video, files, programs, email and other text messages, browsing content on wide area networks like the Internet, and so on.

While interacting, which includes maintaining a conversation over a wireless channel between two users, one user may wish to manipulate a shared object on his or her wireless communication device and communicate that manipulation to another user by graphically showing the same manipulation to the same object on the second user's device. For example, a first and second user may be viewing identical graphic representations of a chair through a display on their mobile telephones. The first user may wish to rotate the chair 90 degrees and have the chair on second user's device follow the same rotation.

Although systems for mobile media exchange exist, the ability to manipulate shared content by the involved parties in real or quasi-real-time does not exist. Current transport mechanisms for sharing media from mobile devices do not expedite or prioritize such interactivity. At best, existing media delivery systems can script such actions but only prior to, the initial media exchange. The inherent delays in current media distribution systems further break the shared user experience and hinder the potential for enhanced or rich communications. Thus, there is a need for rapid peer-to-peer interactivity with exchanged content supported in the context of mixed-mode communications—such as the intermixing of voice and data.

SUMMARY OF THE INVENTION

Briefly, in accordance with the present invention, disclosed is a method and system for manipulating a shared object between two wireless communication devices. The system includes a first device and a second device, each having at least two communication modes—one for voice transmission and reception and one for data transmission and reception. During an ongoing conversation between a user of the first device and a user of the second device, an image is exchanged between the devices, either by temporarily suspending the conversation mode, switching to the data mode, and then switching back to the conversation mode after completion of the data transmission, by interleaving the two modes, or by communicating in both modes simultaneously.

Once the shared object, such as an image, video, audio, program or other multimedia clip is shared between the devices, the devices communicate their respective manipulation capabilities to each other, or, alternatively, the first device, which is originating/requesting a manipulation, queries the second device for it's manipulation capabilities. In this way, at least the first device learns the possible manipulation parameters that it is to work within.

The first device also sends an identifier to the second device, which the second device uses to confirm whether the requesting device is permitted to manipulate the shared object on the second device. This confirmation can be performed by searching a database of permission information, requested from a user via an input, requested from a network, or other similar methods. In a preferred embodiment, three permission levels, "always denied", "always permitted", and "per instance", are available for a device identifier, with "per instance" being the default level. The confirmed permission level is then communicated back to the first device. The "per instance" permission level requires the user of the receiving device to grant permission before manipulation can be carried out. The grant of permission in the "per instance" mode remains valid for an entire manipulation session.

If manipulation permission is granted by the second device—"per instance", "always permitted", or so on—the second device may then receive and process manipulation instructions sent by the first device. To do this, the first communication mode is suspended and the instructions are sent on the second channel. The instructions can be, for example, a rotation of the object, a pointer movement to a location on the object, an adjustment to the shape of the object, and more. The second device then shows the second user the communicated manipulation by updating the display on the second device in accordance with the instructions while restoring communication in the first mode. Since the period between suspending and restoring the first communication mode is short, shared manipulation is realized in a "quasi-real-time" manner.

In another embodiment, short suspension periods of the first channel can be interleaved with on periods and suspension periods of the second channel. In this way, the object is manipulated in "real-time" while the conversation is taking place between the user of the first device and the user of the second device. In still another embodiment, both the first and second communication modes remain active, thereby allowing object manipulation and voice communication to occur simultaneously.

Upon completion of receipt of the manipulation instructions, the second device then transmits to the first device a confirmation indicating whether the manipulation instruction was carried out. If no confirmation message is received by the first device within a designated expected period of time, the first device will assume that the message was not received and will resend the manipulation instruction.

The present invention provides a system and method for two remote users to share an interactive experience of manipulating the same object in the same way on both remote devices at the same time.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE EMBODIMENT

General

While the specification concludes with claims defining the features of the invention that are regarded as novel, it is believed that the invention will be better understood from a consideration of the following description in conjunction with the drawing figures, in which like reference numerals are carried forward.

The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Reference throughout the specification to "one embodiment" means that a particular feature, structure, or characteristic described in connection with the embodiment is included in at least one embodiment of the present invention. Thus, the appearances of the phrases "in one embodiment" in various places throughout the specification are not necessarily all referring to the same embodiment. Furthermore, the particular features, structures, or characteristics may be combined in any suitable manner in one or more embodiments. Moreover these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

The present invention, according to an embodiment, overcomes problems with the prior art by allowing a user of a mobile communication device to wirelessly communicate object manipulation instructions to a remote second device so that the second device can securely receive and carry out the instructions to reveal to a second user the first user's manipulation to a shared object or a set of shared objects, thereby providing a shared interactive experience between the users of the devices. Likewise, the second user can communicate manipulation instructions back to the first device and so on.

The invention also allows a user of a mobile communication device to wirelessly communicate object manipulation instructions to multiple devices so that the user of the sending device can communicate his manipulation instruction to multiple users simultaneously or individually at given time points. Similarly, the invention allows multiple users to coordinate to send a manipulation instruction to a single device or to multiple devices. As an example, multiple users submit manipulation instructions in a substantially simultaneous manner, where the definition of simultaneous varies depending on the context and situation. The network receives all of the instructions sent by the multiple sending devices and a network element for fairness then determines how the multiple instructions are routed. In one embodiment, the majority would determine which instruction is to be followed by the one or more other devices. In another embodiment, each of the users supplying the manipulation instructions focuses on different aspects of the object and all of the inputs are then assembled when received by the receiving device.

In another embodiment of the present invention, a second device sends the object over a local wire or wireless network to a third device and retains control of the object. The third device can be similar to the second device, for instance both are cellular phones, or non-similar to the second device, for instance the second device is a cellular phone and the third device is a projector. The manipulation instructions sent by the first device are received by the second device and forwarded to the third device or applied to the third device by control of the second device. In this example the shared object projected is a picture or series of slides.

In still another embodiment, the first, or sending, device sends a communication to a second device regarding manipulating an object on a third device. The second device grants permission to the first device and returns an address of the third device to the first device. The first device can then communicate the object and/or the manipulation instructions directly to the third device.

It is important to note, that the shared object in the present invention includes any picture, drawing, text, multimedia clip or program including an image, video, audio and other objects capable of being run on a wireless device such as calendars, word processors, spread sheets, e-mail and other office productivity applications. The word "object" as used throughout this specification is not limited to a single object and can include a group of objects.

A "manipulation" includes altering the object, such as moving, rotating, resizing, modifying, coloring, highlighting, deleting, changing dimensions, changing textures, and other similar object modifications. A "manipulation" also includes annotating, moving a pointer, adding elements, such as text, markups, comments, adding or modifying sound, and any other alteration that may or may not affect the object file.

The invention allows the use of multiple communication modes so that the users of the mobile communication devices communicating in a first mode can send object manipulation instructions in a second communication mode without abandoning the first communication mode. For example, a person using a mobile communication device designed in accordance with the invention may initiate a voice call to a second party, and while engaged in the voice call, transfer instructions for manipulating an image file to the second party using a data mode of communication. The invention contemplates that the use of multiple modes of communication can be performed by either suspending the first mode while engaging in the second mode, and reestablishing the first mode when the second mode is finished, interleaving two modes, or both modes may be used at the same time.

The present invention in one embodiment makes use of mixed mode communications. On teaching of mixed mode communications is described in the commonly assigned, co-pending U.S. application Ser. No. 10/737,065 now [Pending], filed on Dec. 16, 2003 entitled "Method and Apparatus for Mixed Mode Personal Communication", is hereby incorporated by reference in its entirety.

Also, the present invention in one embodiment makes use of mixed mode communications. On teaching of mixed mode communications is described in the commonly assigned, co-pending U.S. application Ser. No. 10/896,221 now [Pending], filed on Jul. 20, 2004 entitled "Adaptive Plug-In Architecture For Mix-Mode Personal Communication", is hereby incorporated by reference in its entirety.

System Diagram

Figure 1:
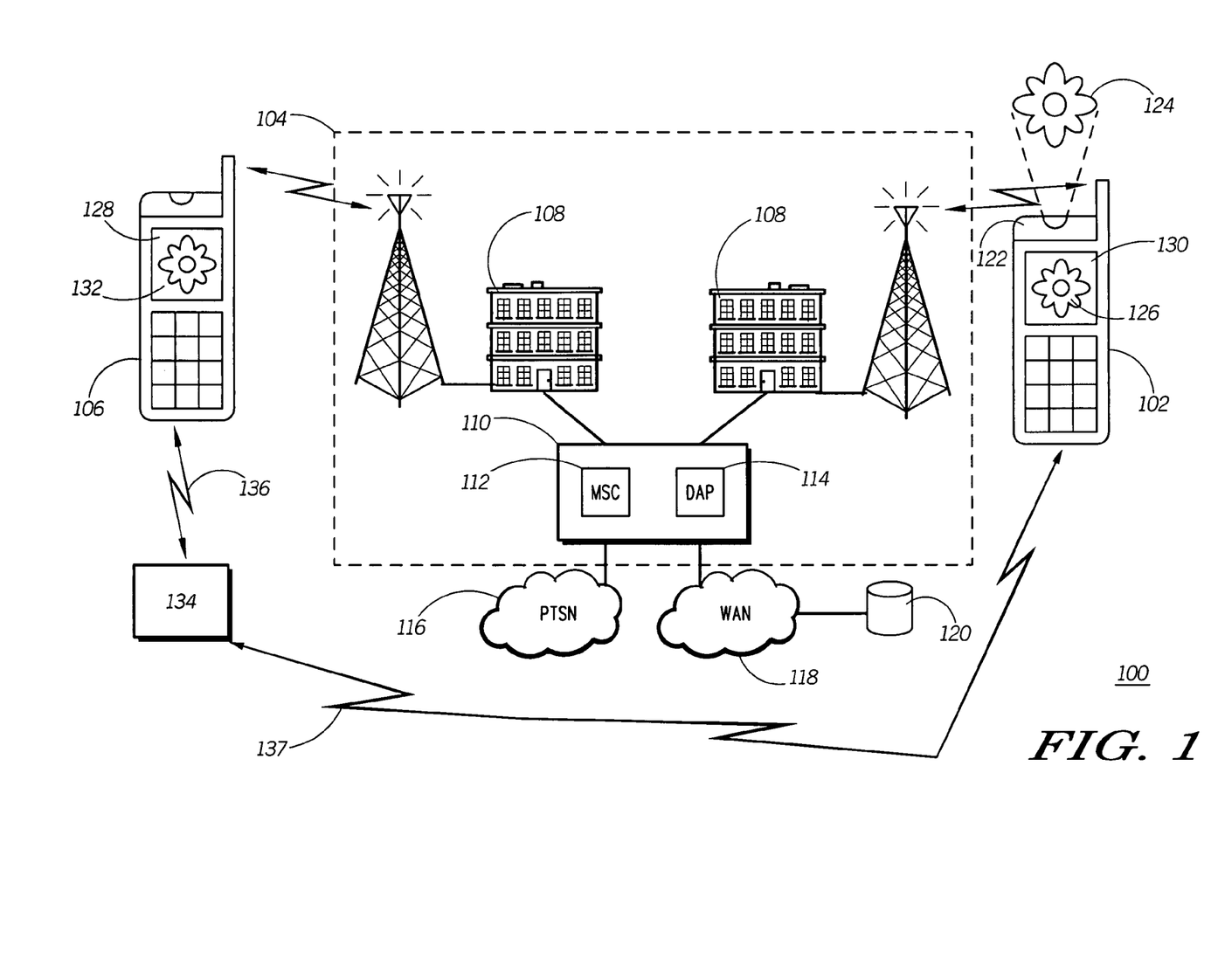
FIG. 1 is an overall system diagram illustrating one embodiment of a mobile communication network in accordance with the present invention.

Referring now to FIG. 1, there is shown a system diagram 100 of a communication system for supporting shared object manipulation communication in accordance with the invention. A first mobile communication device 102 is used by a first user. The first mobile communication device communicates with a communication system infrastructure 104 to link to a second mobile communication device 106. The communication system infrastructure includes base stations 108 which establish service areas in the vicinity of the base station to support wireless mobile communication, as is known in the art.

There are at least two major forms of voice communication that are in widespread use, which are regular full duplex telephony, and half duplex dispatch calling, each facilitating at least one of two modes, voice and non-voice. Dispatch calling includes both one-to-one "private" calling and one-to-many "group" calling. Non-voice mode communication includes SMS, chat, such as Instant Messaging, and other similar communications.

The base stations 108 communicate with a central office 110 which includes call processing equipment for facilitating communication among mobile communication devices and between mobile communication devices and parties outside the communication system infrastructure, such as mobile switching center 112 for processing mobile telephony calls, and a dispatch application processor 114 for processing dispatch or half duplex communication.

The central office 110 is further operably connected to a public telephone switching network (PTSN) 116 to connect calls between the mobile communication devices within the communication system infrastructure and telephone equipment outside the system 100. Furthermore, the central office 110 provides connectivity to a wide area data network (WAN) 118, which may include connectivity to the Internet.

The network 118 may include connectivity to a database server 120 to support querying of user's calling parameters so that when one user desires to engage in mixed mode communication, the server facilitates automatic call setup by, for example, cross referencing calling numbers with network identifiers such as IP addresses. Thus, while a first user is engaged in, for example, dispatch communication with a second user, the first user's mobile communication device 102 may use the dispatch identifier of the second user to cross reference on the server 120 and acquire the second user's IP address to establish a packet data session with the second user as part of a mixed mode communication.

It is important to note that the above communications system infrastructure 104 in one embodiment permits multiple physical communication links or channels. In turn each of these physical communication channels such as AMPs, GSN, TDMA, supports one or more communications channels such as lower bandwidth voice and higher bandwidth payload data. Further, the communications channel supports two or more formats or protocols such as voice, data, text-messaging and alike.

In one embodiment of the invention, the mobile communication device 102 comprises an object capturing means. The object capturing means can be built-in to the mobile communication device 102 or externally coupled to the mobile wireless device through a wired or wireless local interface. Embedded or remotely attached devices include, removable storage medium such as memory sticks and cards, digital and still cameras, microphones, and network appliances. Through-out the remainder of this description, reference is made to an exemplary camera as an object capturing means and it is important to note that other object capturing devices such as those listed above are within the true scope and spirit of the present invention. In this example, the mobile communication device 102 includes a camera 122 for capturing an image of an object 124 and displaying the image 126 on a display 130 of the mobile communication device 102. In another embodiment, the device 102 can acquire an image of an object from a media, such as a disk. In still other embodiments, the object can be received from a network, such as the internet, can be rendered from a software program, drawn by a user, or other similar methods. The object can also include text, sounds, or anything capable of being rendered or processed on a mobile device.

Using a mixed mode method, the user of the first mobile communication device 102 can transmit the object to the second mobile communication device 106, where the second mobile communication device 106 will provide a rendered image 128 of the object on the display 132 of the second mobile communication device 106 to be viewed by the user of the second mobile communication device.

Wireless Device

Figure 2:
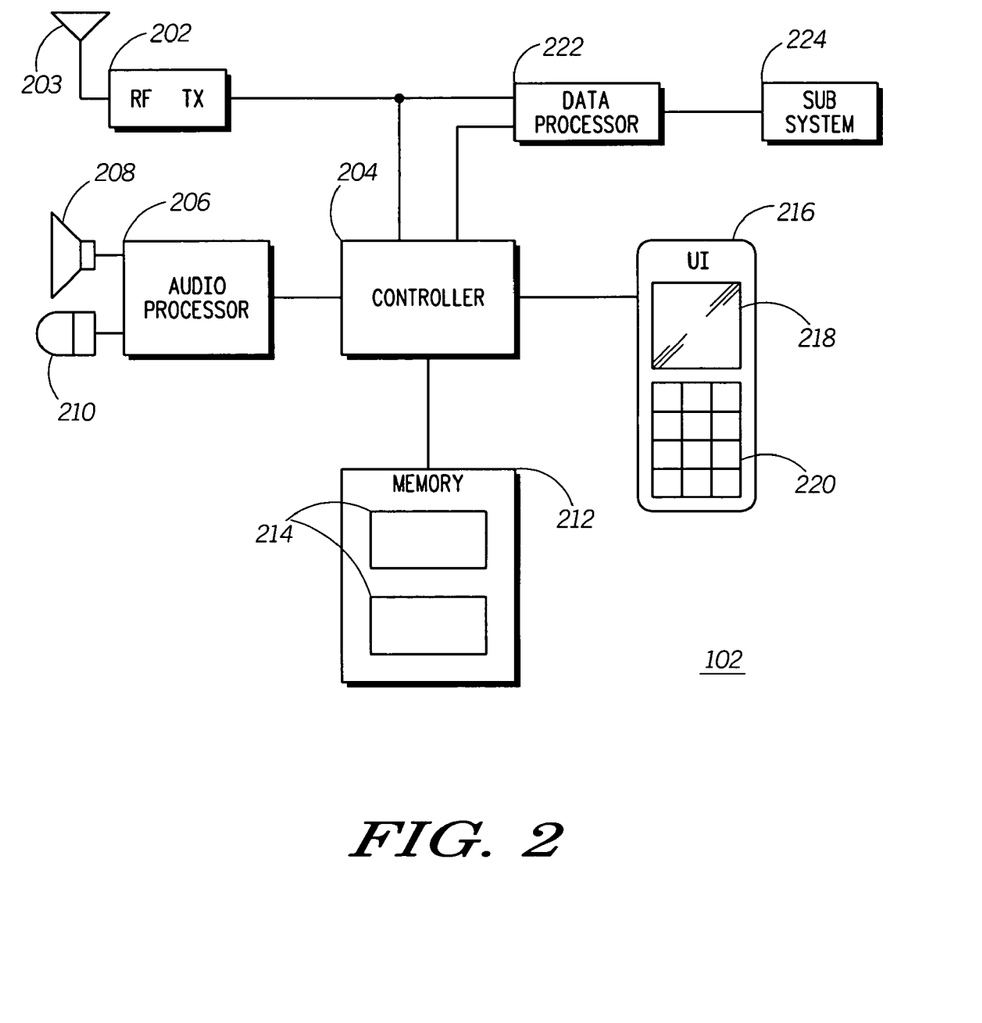
FIG. 2 is a hardware block diagram illustrating one embodiment of a wireless device in accordance with the present invention.

Referring now to FIG. 2, there is shown a schematic block diagram of a mobile communication device 102 designed for use in accordance with the invention. The mobile communication device 102 comprises a radio frequency transceiver 202 for communicating with the communication system infrastructure equipment 104 via radio frequency signals over an antenna 203. The operation of the mobile communication device and the transceiver is controlled by a controller 204. The mobile communication device also comprises an audio processor 206 which processes audio signals received from the transceiver to be played over a speaker 208, and it processes signals received from a microphone 210 to be delivered to the transceiver 202. The controller 204 operates according to instruction code disposed in a memory 212 of the mobile communication device. Various modules 214 of code are used for instantiating various functions, including the present shared object manipulation via mixed modes of communication. To allow the user to operate the mobile communication device 102, and receive information from the mobile communication device 102, the mobile communication device 102 comprises a user interface 216, including a display 218, and keypad 220. Furthermore, it is contemplated that the mobile communication device may comprise additional data processing means 222 for supporting a subsystem 224 attached to the mobile communication device or integrated with the mobile communication device, such as, for example, a camera. The data processor 222, under control by the controller 204, can operate the subsystem 224 to acquire information and graphical objects or data objects and provide it to the transceiver 202 for transmission.

Thus the invention comprises a shared interactive experience between two or more users manipulating a shared object between a first party using a first communication device 102 and second party using a second communication device 106 in a real-time interaction. The method commences by establishing a communication link in a first communication mode between a first and a second party using first and second wireless devices 102, 106, respectively. For clarification purposes, the method will be described with the first user being the user that initiates the manipulation of the shared object, but the invention is not so limited.

Because the devices may not be physically the same, i.e., having the same features and abilities, the devices will communicate with each other the manipulation capabilities of each device, which define the possible manipulations that can be supported on each device. Working within these limits, the first user enters a manipulation instruction(s) into the first device. The first communication mode is suspended, a second communication mode is entered and the instruction is transmitted to the second device in the second communication mode via communication system infrastructure equipment 104. In one embodiment, the first user's device shows a manipulation-in-progress message to the first user until a confirmation is received from the second device.

The second user's device receives the manipulation instruction and parses the incoming message for application type to determine that it is a manipulation instruction. The device then notifies the second user that a message has arrived and the type of message. It may be desirable for several reasons to protect the object on the second device from being manipulated without permission. For this reason, a plurality of permission levels may be provided. In one embodiment, three permission levels are available, which include "always permitted", "always denied", or "per instance". When the manipulation instruction arrives at the second device an identifier may accompany it that identifies the originator or originating device of the manipulation instruction. The second device can then search within a memory to cross-reference the identifier to a manipulation permission identifier that has a predetermined permission level. In the situation where the memory does not contain a manipulation permission identifier, the second user can be prompted to select the permission level. If the level "always permitted" is assigned or selected for the incoming message, the method will continue. If the level "always denied" is assigned or selected for the incoming message, the second device will reject the manipulation instruction and the manipulation process will stop, although the conversation mode may continue.

A "per instance" permission level is the default level if the identifier is not recognized or no level is assigned. The "per instance" level halts execution of the manipulation instruction until the user approves the source of the instruction. The second device then communicates back to the first device that the instruction was received and whether permission is granted for manipulation of the shared object to occur. The grant of permission in the "per instance" mode remains valid for an entire manipulation session. The three permission levels just discussed are for exemplary purposes only and the invention is not so limited.

If manipulation permission is granted, the manipulation instruction(s) is followed by the second device and the object is manipulated on the second device in accordance with the instructions sent by the first device and the manipulation capabilities of the second device. The first device is then sent confirmation of the manipulation on the second device, the second communication mode is suspended or ended, and the first communication mode is restored between the first and second devices.

In the event of failure, where a confirmation of instruction receipt is never received by the first device, or the original instruction is never received by the second device, a timer within the first device will, after a preselected period of time, prompt the first user to retry sending the instructions or ignore the message.

It is important to note that both the sending user and the receiving user do not necessarily experience identical interactive experiences. As an example, if the sending user is mobile and viewing a map on his first device 102, and the map is interactively tracking the second user carrying the second device 106, the first user will see his position relative to the second user. Alternatively, the second user will view the map with his position (the second user) relative to the first user. Another example is that an alert instruction on one device is an audible noise, while the same alert is a vibration on another device.

Surrogate Device

Referring again to FIG. 1, a third device, or "surrogate" device 134 is shown attached to the second device 106 through a communication link 136. The surrogate device 134 can be similar to the second device 106, for instance both are cellular phones. Alternatively, the surrogate device 134 and the second device 106 can be non-similar devices, for instance the second device 106 is a cellular phone and the surrogate device 134 is a projector. The communication link 136 can be a wired link or a wireless link over a wireless communication channel.

In one embodiment of the present invention, the second device 106 sends the object over the communication link 136 to the surrogate device 134 and retains control of the object. The manipulation instructions sent by the first device 102 are received by the second device 106 and forwarded to the surrogate device 134 or applied to the surrogate device 134 by control of the second device 106. As an example, the surrogate device 134 is a projector and the shared object projected is a picture or series of slides. Each instruction transmitted from the first device 102 to the second device 106 produces a manipulation that is carried out at the projector and displayed on the projector target.

In another embodiment of the present invention, the second device 106 grants permission to the first device 102 to communicate directly to the surrogate device 134 via a wired or wireless communication link 137. For example, an IP based set top box can be controlled by the first device 102 after its IP address is communicated to the first device 102 by the second device 106. In this embodiment, the first device 102 can communicate the object itself to the surrogate device, or just the manipulation instructions after the object has been communicated to the surrogate device 134 by the second device 106. The manipulation on the surrogate device can also be accomplished from a combination of instructions sent from the first 102 and second 106 devices to the surrogate device 134.

Flow Diagram for Quasi-Real-Time

Figure 3:
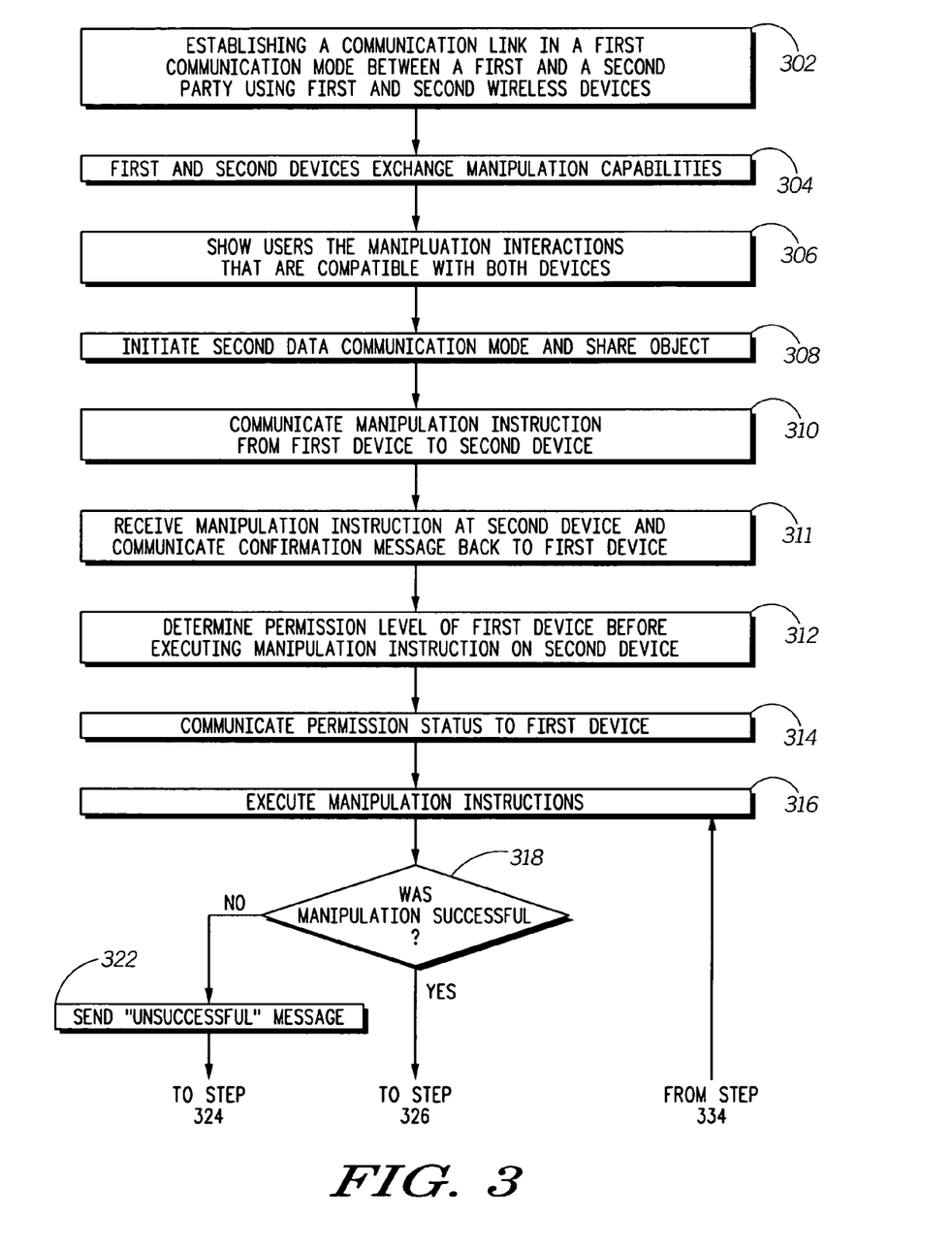
FIGS. 3 and 4 are a flow diagram of a process for manipulating a shared object in quasi-real-time in accordance with the present invention.
Figure 4:
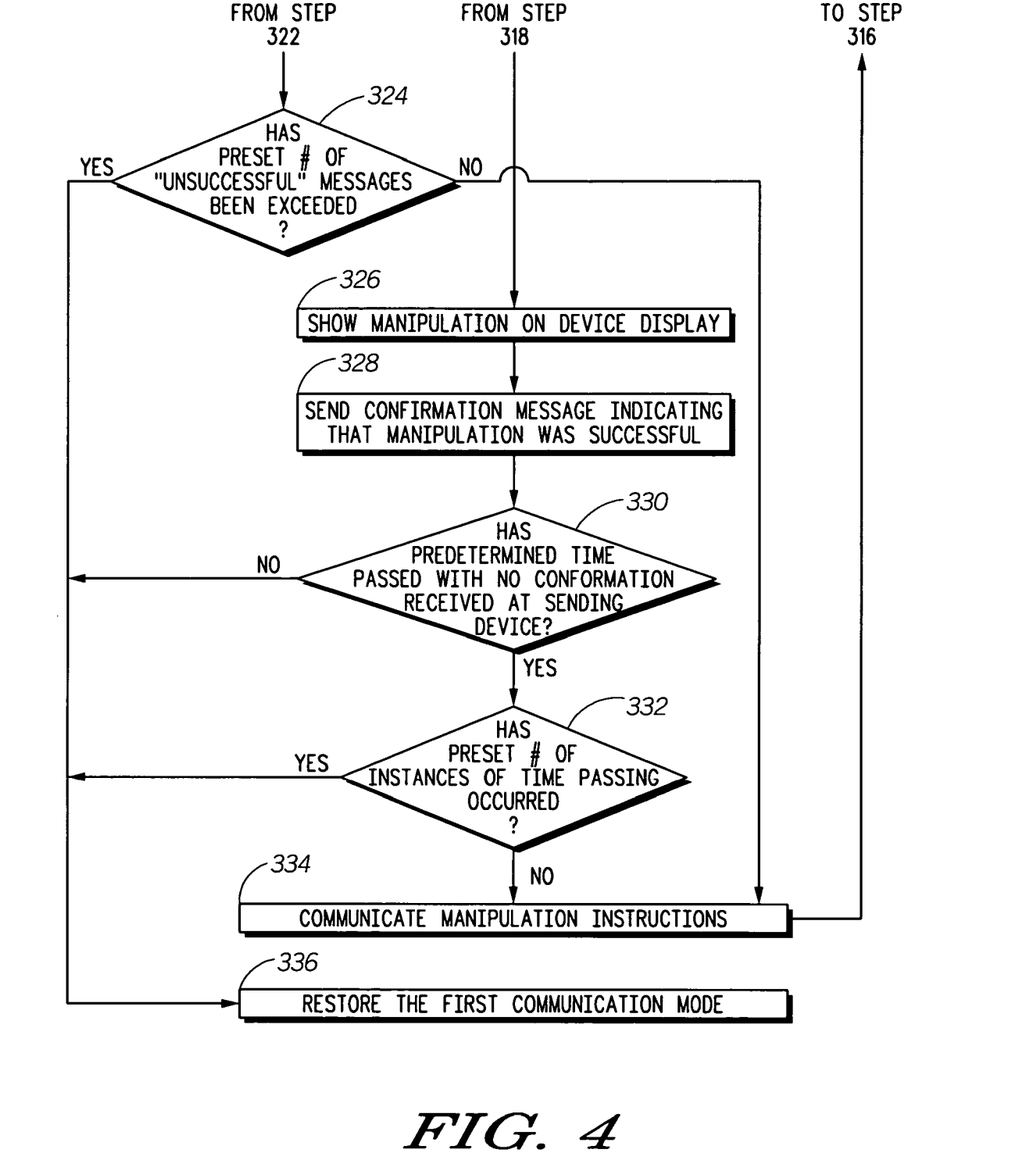

Referring now to FIGS. 3 and 4, the method just described, according to the present invention for manipulating a shared object between two wireless devices, is shown. The method commences at step 302 by establishing a communication link in a first communication mode between a first and a second party using first and second wireless devices, respectively. During the course of a conversation on the first communication mode, the first and second devices exchange manipulation capabilities with each other in step 304. After the capabilities have been exchanged, the first device shows the first user the manipulation interactions that are compatible with both devices as well as the current shared data object in step 306.

In a first embodiment, the object has previously been shared between the two devices. In another embodiment however, the object can be shared after manipulation capabilities have been exchanged. If the first user decides to manipulate the object, the first device will initiate suspension of the first communication mode and connection of a second data communication mode, shown in step 308. After initiation of the second mode is complete, a manipulation instruction is sent to second device at step 310. The first device then waits to receive a confirmation message from the second device. In one embodiment, a manipulation-in-progress message is displayed on the first device while waiting for confirmation. The second device receives the manipulation instructions and transmits a confirmation message back to the first device in step 311.

The second device checks the permission level of the first device to determine how to respond to the received manipulation instruction, step 312. If permission is granted, in step 314, the second device communicates this information back to the first device. The first device then waits for confirmation of manipulation instruction execution while the second device attempts to follow the manipulation instruction in step 316. If the manipulation instruction is successfully followed in step 318, the object on the second device will be manipulated and the second user will observe the manipulation on the second device in step 326. A confirmation message indicating successful manipulation is then sent to the first device, step 328.

However, if the manipulation was not successful in step 318, due to limitations in the second device, losses occurring during transmission, or other reasons, a notice of unsuccessful manipulation is sent to the first device in step 322. The first device can be set to automatically retry sending the instruction again, as shown in step 324. Each sending device, in this example, the first device, is provided with a counter that will limit the number of retries resulting from an unsuccessful manipulation. In the event that the number of retries is exceeded, the first device will return function to the first communication mode, as shown in step 336.

The sending device, here the first device, is also provided with a counter so that if no confirmation is sent within a predefined period of time, the first device will resend the instruction in step 334 as long as the number of instances of exceeded times with no confirmation has not been exceeded in step 332. If no confirmation is received within the predefined number of resends, the first device will attempt to restore the first communication mode with the second device in step 336 and end the second communication mode.

It is also contemplated that the user of the second device will want to reply to the manipulation by sending a new manipulation instruction to the first device. In this case, it is not necessary to exchange manipulation capabilities and may also not be necessary to confirm permission levels. If the devices are still communicating in the second communication mode, the second device can transmit instructions directly to the first device using the second communication mode as in step 334. However, if communication has already returned to the first communication mode, the second device will begin at step 308 where suspension of the first mode and initiation of the second mode is necessary.

Flow Diagram for Real-Time

Figure 5:
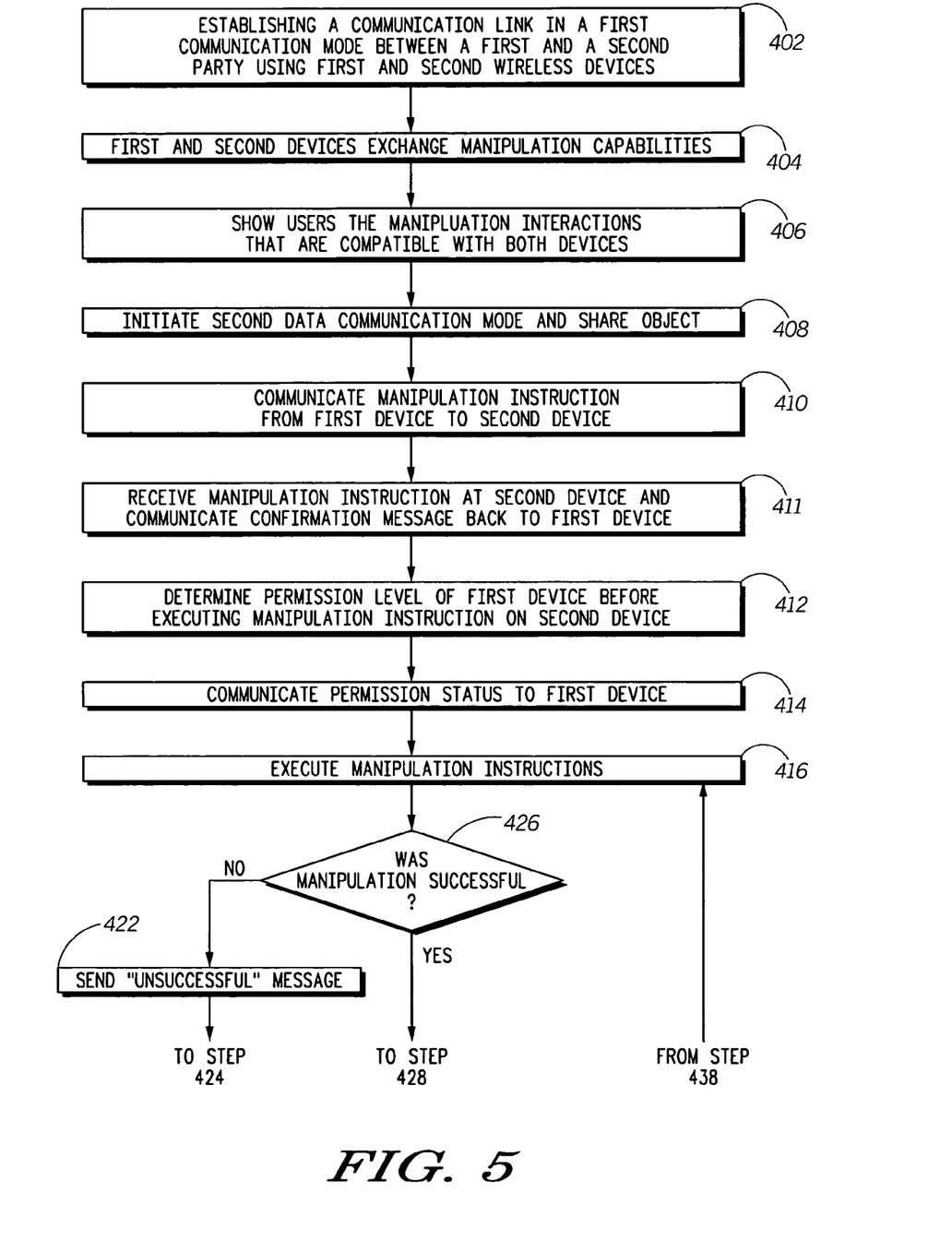
FIGS. 5 and 6 are a flow diagram of a process for manipulating a shared object in real-time in accordance with the present invention.
Figure 6:
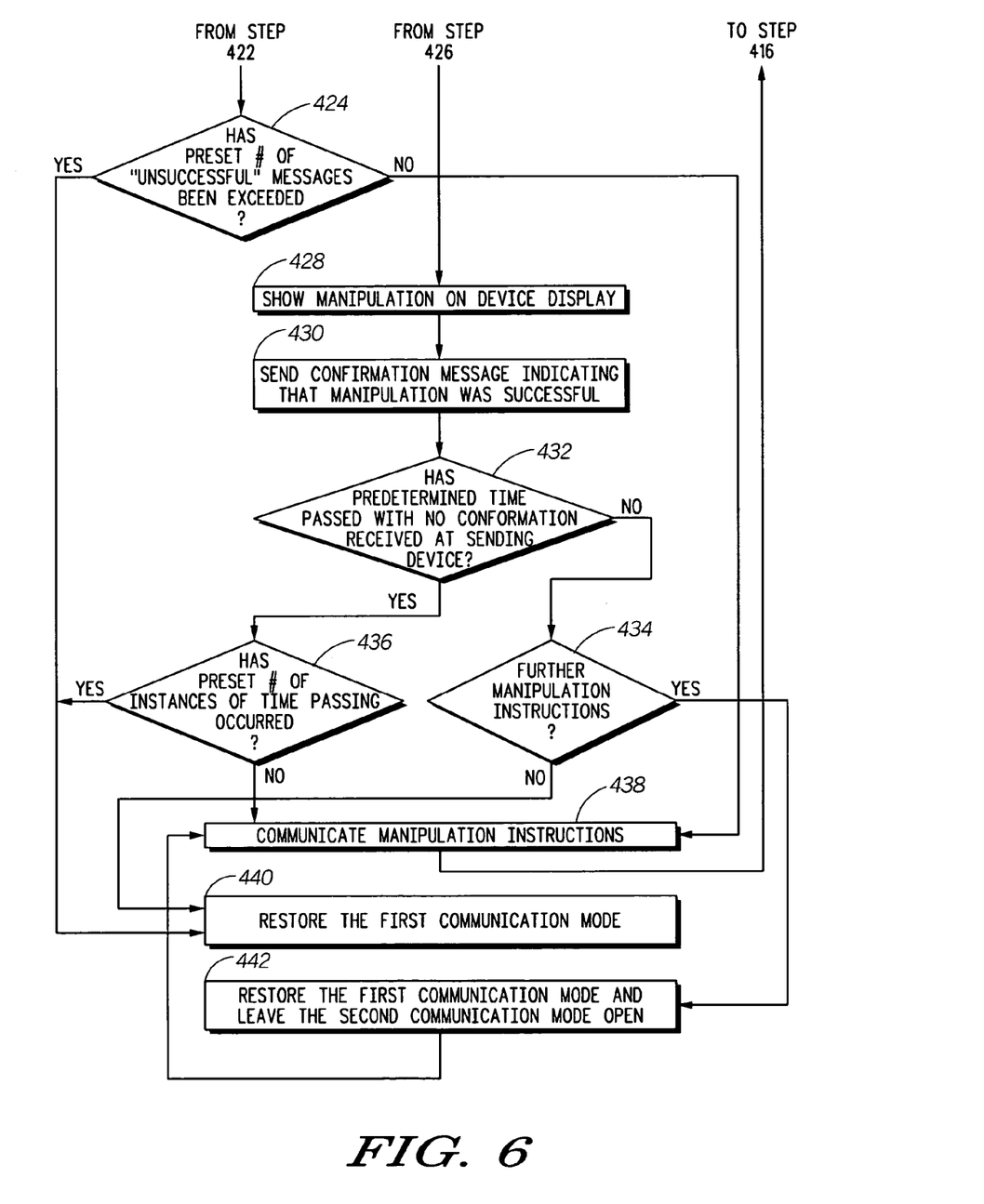

In a second embodiment of the present invention, a real-time experience is contemplated. This method is shown in FIGS. 5 and 6. In this embodiment, the modes of communication are not exclusive but are either interleaved with one another, so that the voice and data communication modes are alternately suspended and restored while data transmission is taking place so that voice communication between the first and second devices is maintained while data transmission, including manipulation instructions, are continuously being performed, or, alternatively, both modes are active simultaneously. In this embodiment, a continuous dialog of instructions and voice is sent between the two devices and each device can transmit manipulation instructions to the other device so that manipulations are performed in a real-time manner on both devices.

As shown in step 402 in FIG. 5, a call is initiated in a first communication mode between a first and a second party using first and second wireless devices. During the course of the call in the first mode, the devices exchange manipulation capabilities with each other in step 404. After the capabilities have been exchanged, the first device shows the first user the manipulation interactions that are compatible with both devices, step 406. Again, the terms "first" and "second" devices are for exemplary purposes only and in practice, either device can perform any of the functions described herein.

Next, in step 408, the second mode is initiated and an object is shared between the two devices. In one embodiment, the first mode is suspended while the object is shared, but does not necessarily have to be suspended and could remain active while the devices are communicating in the second mode. In yet another embodiment, the object can be shared using a third mode. In still another embodiment of the present invention, the object is shared between the devices prior to step 408.

Next, in step 410, a manipulation session is initiated and an instruction is transmitted to the second device in the second mode. The first device then enters a timeout to await a response message from the second device, the message indicating that the manipulation instruction was received and whether or not it was successful.

In step 411, if the second device is within range and working properly, it will receive the manipulation instruction sent in step 410 and transmit back to the first device a confirmation message indicating safe receipt of the instruction.

The second device then checks the permission level of the first device to determine how to respond to the received manipulation instruction, step 412. If permission is granted, in step 412, the second device communicates this information back to the first device in step 414. The first device then waits for confirmation of manipulation instruction execution while the second device attempts to follow the manipulation instruction in step 416. If the manipulation instruction is successfully followed in step 426, the object on the second device will be manipulated and the second user will observe the manipulation on the second device in step 428. A confirmation message indicating successful manipulation is then sent to the first device, step 430.

However, if the manipulation was not successful, due to limitations in the second device, losses occurring during transmission, or other reasons, a notice of unsuccessful manipulation is sent to the first device in step 422. The first device can be set to automatically retry sending the instruction again, as shown in step 438. Each sending device, in this example, the first device, is provided with a counter that will limit the number of retries resulting from an unsuccessful manipulation. In the event that the number of retries is exceeded, the first device will return function to the first communication mode, as shown in step 440.

The sending device, here the first device, is also provided with a counter so that if no manipulation confirmation is sent within a predefined period of time, the first device will resend the instruction in step 438 as long as the number of instances of exceeded times with no confirmation has not been exceeded. If no confirmation is received within the predefined number of resends, the first device will attempt to restore the first communication mode with the second device in step 440 and end the second communication mode.

After the response message is received from the second device, step 430, either a second manipulation initiation message is sent from the first device to the second device or from the second device to the first device in step 438. This indicates that a real-time session is desired and in step 442, the first mode of communication is restored while the second mode is in use. The process returns to step 416, however, this time bi-directional communication between the first and second devices takes place where manipulation instructions are transmitted back and forth. After each instruction is sent, the method checks to see if further session interaction is needed. If no further interaction is required, the second mode is ended and communication in only the first mode continues in step 440.

While the various embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A wireless handheld device for manipulating a shared multimedia object, the device comprising:
   a transceiver operable to wirelessly transmit to and receive from a second wireless handheld device on at least one physical communication link having a plurality of physical communication channels, wherein each of the physical communication channel is separate from each other,
   wherein the device transmits a request to the second wireless handheld device for receiving a set of manipulation capabilities of the second wireless handheld device on the shared multimedia object, wherein the set of manipulation capabilities indicates a set of manipulation actions that the second wireless handheld device is able to perform on the shared multimedia object; and
   a user input that receives at least one manipulation instruction, wherein the at least one manipulation instruction is based on the set of manipulation capabilities received from the second wireless handheld device,
   wherein the device communicates with the second wireless handheld device in a first physical communication channel and transmits at least one manipulation instruction to the second wireless handheld device in a second physical communication channel so as to manipulate a presentation of at least one shared multimedia object on the second wireless handheld device that has been previously acquired with a multimedia object capturing device coupled to one the first wireless handheld device and the second wireless handheld device.

2. The wireless handheld device according to claim 1, wherein the transceiver transmits a request to the second wireless handheld device before transmitting manipulation instructions, wherein the manipulation instructions include one of more of moving, rotating, resizing, coloring, highlighting, deleting, annotating, modifying sound, changing dimensions, and changing textures of the multimedia object.

3. The wireless handheld device according to claim 1, wherein the request for the set of manipulation capabilities is transmitted in the first physical communication channel and the manipulation instruction is transmitted in the second physical communication channel with the first physical communication channel suspended.

4. The wireless handheld device according to claim 2, wherein the manipulation instruction is transmitted in the second physical communication channel while the first physical communication channel and the second physical communication channel are interleaved.

5. The wireless handheld device according to claim 1, further comprising:
   a counter that counts a preselected amount of time, starting after the manipulation instruction is sent, and resends the manipulation instruction if a manipulation confirmation signal is not received within the preselected amount of time.

6. A wireless handheld device for manipulating a shared object, the device comprising:
   a set of manipulation capabilities associated with at least one share multimedia object on the wireless handheld device, wherein the set of manipulation capabilities indicates a set of manipulation actions that the wireless handheld device is able to perform on the shared multimedia object;
   a transceiver operable to wirelessly transmit and receive on a first physical communication channel and a second physical communication channel,
   wherein the transceiver receives from at least a second wireless handheld device a request for information regarding the set of manipulation capabilities to a presentation of a least one shared multimedia object on the device and transmits information regarding the set of manipulation capabilities to the second wireless handheld device, and wherein the transceiver receives from the second wireless handheld device a set of manipulation capabilities of the second wireless handheld device on the shared multimedia object; and
   a user interface for displaying to a user of the first wireless handheld device a set of compatible manipulation capabilities that are compatible between the first wireless handheld device and the second wireless handheld device based on the set of manipulation capabilities of the wireless handheld device and the set of manipulation capabilities received from the second wireless handheld device.

7. The wireless handheld device according to claim 6, further comprising:
   a comparator that compares a received manipulation instruction to the set of manipulation capabilities,
   wherein if the set of manipulation capabilities includes capabilities necessary to execute the manipulation instruction, the wireless handheld device follows the manipulation instruction.

8. The wireless handheld device according to claim 6, further comprising:
   at least one manipulation permission identifier, and
   a comparator that compares a received manipulation instruction originator identifier with each manipulation permission identifier and follows the manipulation instruction only if the manipulation instruction originator identifier is equivalent to one of the manipulation permission identifiers.

9. The wireless handheld device according to claim 6, wherein the transceiver transmits information regarding its manipulation capabilities to the second wireless handheld device before executing received manipulation instructions from the second device.

10. The wireless handheld device according to claim 6, wherein the request for manipulation capabilities is received in the first physical communication channel and a manipulation instruction is received in the second physical communication channel with the first physical communication channel suspended.

11. The wireless handheld device according to claim 6, wherein a manipulation instruction is received in the second physical communication channel while the first physical communication channel remains connected.

12. The wireless handheld device according to claim 6, further comprising:
at least one communication link to a third device for communicating at least one manipulation instruction to the third device for execution on the third device.

13. A wireless handheld device for manipulating a shared object, the device comprising:
a transceiver operable to wirelessly transmit and receive on a first physical communication channel and a second physical communication channel,
wherein the wireless handheld device transmits a request to the second wireless handheld device for receiving a set of manipulation capabilities of the second wireless handheld device on the shared multimedia object, wherein the set of manipulation capabilities indicates a set of manipulation actions that the second wireless handheld device is able to perform on the shared multimedia object;
a user input that receives at least one manipulation instruction, wherein the at least one manipulation instruction is based on the set of manipulation capabilities received from the second wireless handheld device,
wherein the wireless handheld device transmits on the second physical communication channel the at least one manipulation instruction so as to manipulate at a presentation of least one shared multimedia object on a second wireless handheld device that has been previously acquired with a multimedia object capturing device coupled to one of the first wireless handheld device and the second wireless handheld device.

14. The wireless handheld device according to claim 13, wherein the transceiver transmits the request for manipulation capabilities to the second device before transmitting manipulation instructions.

15. The wireless handheld device according to claim 14, wherein the request for manipulation capabilities is transmitted in the first physical communication channel and the manipulation instruction is transmitted in the second physical communication channel with the first physical communication channel suspended.

16. The wireless handheld device according to claim 14, wherein the manipulation instruction is transmitted in the second physical communication channel while the first physical communication channel remains connected.

17. A method of manipulating an object between a first party using a first wireless handheld communication device and a second party using a second wireless handheld communication device, the method on a first communication device comprising:
establishing a wireless communication link between a first and at least a second wireless handheld device using a first physical communication channel;
establishing a wireless communication link between the first and at least the second device using a second physical communication channel;
transmitting a manipulation capability request to the second wireless handheld device for a set of manipulation capabilities of the second wireless handheld device associated with at least one shared multimedia object on the second wireless handheld device;
receiving, in response to transmitting the manipulation capability request, the set of manipulation capabilities from the second wireless handheld device, wherein the set of manipulation capabilities indicate a set of manipulation actions that the second wireless handheld device is able to perform on the shared multimedia object; and
transmitting a manipulation instruction from the first wireless handheld device to the second wireless handheld device using the second physical physical communication channel so as to manipulate a presentation of a least one shared multimedia object on the second device that has been previously acquired with a multimedia object capturing device coupled to one of the first wireless handheld device and the second wireless handheld device, wherein the manipulation instruction is based on the set of manipulation capabilities received from the second wireless handheld device.

18. The method according to claim 17, further comprising:
suspending the first physical communication channel before establishing a communication link between the first and second devices using the second physical communication channel.

19. The method according to claim 18, further comprising:
restoring the first physical communication channel e between the first and second devices after manipulating the object.

20. The method according to claim 17, further comprising:
suspending the second physical communication channel between the first and second devices after the manipulation instruction is received by the second device.

21. The method according to claim 17, further comprising:
exchanging object manipulation capabilities between the first device and the second device before suspending the first physical communication channel.

22. The method according to claim 17, further comprising:
confirming with the second device whether manipulation permission is granted to the first device before manipulating the object.

23. The method according to claim 18, further comprising:
transmitting from the second device to the first device information indicating whether or not manipulation permission is granted.

* * * * *